(12) United States Patent
Lv et al.

(10) Patent No.: US 12,164,942 B2
(45) Date of Patent: Dec. 10, 2024

(54) DISPLAYING REMOTE DESKTOP INFORMATION WITH ADJUSTABLE TRANSPARENCY

(71) Applicant: VMware, Inc., Palo Alto, CA (US)

(72) Inventors: Lin Lv, Beijing (CN); Yunxia Cheng, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/128,247

(22) Filed: Mar. 30, 2023

(65) Prior Publication Data

US 2024/0231859 A1 Jul. 11, 2024

(30) Foreign Application Priority Data

Jan. 9, 2023 (WO) ................ PCT/CN2023/071248

(51) Int. Cl.
*G06F 3/0481* (2022.01)
*G06F 3/04845* (2022.01)
*G06F 3/04847* (2022.01)
*G06F 9/451* (2018.01)

(52) U.S. Cl.
CPC ............ *G06F 9/452* (2018.02); *G06F 3/0481* (2013.01); *G06F 3/04845* (2013.01); *G06F 3/04847* (2013.01); *G06F 2203/04804* (2013.01)

(58) Field of Classification Search
None
See application file for complete search history.

(56) References Cited

U.S. PATENT DOCUMENTS

| 2011/0074813 A1* | 3/2011 | Masumoto | G06T 15/503 345/629 |
| 2011/0246904 A1* | 10/2011 | Pinto | G06F 9/452 715/740 |
| 2013/0125046 A1* | 5/2013 | Gaul | G06F 3/0484 715/790 |
| 2014/0267090 A1* | 9/2014 | Heyman | G06F 3/0481 345/173 |
| 2018/0018129 A1* | 1/2018 | Nikaido | G06F 11/3433 |
| 2018/0033093 A1* | 2/2018 | Maculan | G06F 21/6263 |

OTHER PUBLICATIONS

Github, Inc., "The Live Transcribe Speech Engine", available at <URL: https://github.com/google/live-transcribe-speech-engine>, Apr. 22, 2021, 14 pages.
Github, Inc., "AutoLingo", available at <URL: https://github.com/AutoLingo/autolingo>, Apr. 21, 2017, 4 pages.
Microsoft, Inc., "Programming reference for the Win32 API", available at <URL: https://learn.microsoft.com/en-us/windows/win32/api/>, 2023, 6 pages.
Non-Published Commonly Owned U.S. Appl. No. 18/119,293, filed Mar. 9, 2023 , 43 pages, VMware, Inc.
Non-Published Commonly Owned U.S. Appl. No. 18/128,248, filed Mar. 30, 2023, 40 pages, VMware, Inc.

* cited by examiner

*Primary Examiner* — Rinna Yi
(74) *Attorney, Agent, or Firm* — Kim & Stewart LLP

(57) ABSTRACT

Information, such as information pertaining to a remote desktop, may be presented concurrently with an image of the remote desktop on an unused area of a display screen. The information may be presented with a selectable and adjustable transparency.

18 Claims, 10 Drawing Sheets

DISPLAYING REMOTE DESKTOP INFORMATION WITH ADJUSTABLE TRANSPARENCY

CROSS-REFERENCE TO RELATED APPLICATIONS

The present application claims the benefit of Patent Cooperation Treaty (PCT) Application No. PCT/CN2023/071248, filed Jan. 9, 2023. The present application is also related in subject matter to U.S. patent application Ser. No. 18/119,293, filed Mar. 9, 2023, and to U.S. patent application Ser. No. 18/128,248, filed Mar. 30, 2023, entitled "DISPLAYING A REMOTE DESKTOP WITH CONTROLLABLE TRANSPARENCY". The above PCT application and US patent applications are incorporated herein by reference in their entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (local client device or local user device) of the user, just as if the OS/applications were actually running locally on the endpoint device, when in reality the OS/applications are running on the remote desktop.

Working remotely on a regular or occasional basis, such as via remote desktops rendered on laptops (or other endpoint device), has become common due to the flexibility and convenience. When a user is working on a remote desktop, the user often wishes to watch/monitor the running status of the remote desktop, so that the user would know whether aspects/components of the remote desktop are operating properly, whether there are components/aspects of the remote desktop that are malfunctioning or need updates, etc. Furthermore, while working on a remote desktop, the user may also wish to receive notifications of events that occur on the local client device or on the remote desktop. However, it can be difficult to effectively and efficiently present these and other types of information during a remote desktop session when a user is operating a remote desktop.

DETAILED DESCRIPTION

Figure 1:
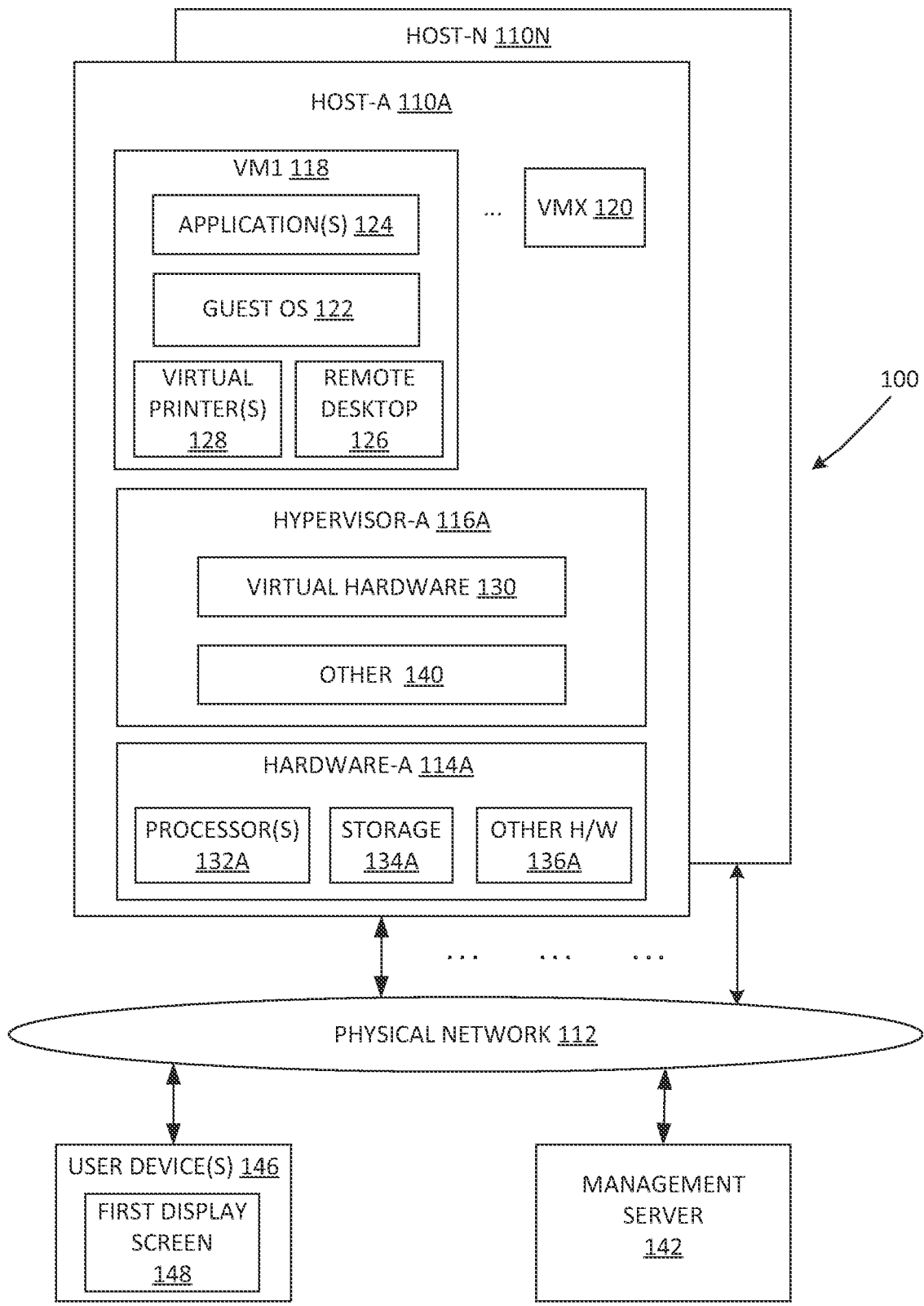
FIG. 1 is a schematic diagram illustrating an example virtualized computing environment that can implement a virtual desktop infrastructure (VDI) having capability to enable the transparent display of remote desktop information concurrently with operating a remote desktop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with viewing some types of information (such as remote desktop information or other types of information) concurrently with operating/using a remote desktop. For example and as previously explained above, there are some status-related remote desktop information that a user may wish to view while using a remote desktop. Examples of such remote desktop information may include but are not limited to:

1. Basic/general information about the remote desktop, such as internet protocol (IP) address, machine name, domain, etc.
2. Performance-related information pertaining to the remote desktop, such as network bandwidth, client-to-remote/remote-to-client display protocol, frame per second (FPS) of the remote display, central processing unit (CPU) usage on the remote desktop, etc.
3. Remote service status, such as the status for an agent service, display protocol service, client drive redirection, clipboard redirection, printer redirection, uniform resource locator (URL) redirection, etc., wherein redirection involves using a local peripheral device from a remote desktop session, such as printing to a local printer for a print job sent to a virtual printer from a remote (virtual) desktop.
4. The health of redirected peripherals, such as a camera, mouse, keyboard, smartcard reader, printer, etc.

Users may also want to get notified regarding application events (such as a new message on Slack, an incoming call on Microsoft Teams, or a new email on Microsoft Outlook) that occur on their local client device when the users are working on remote desktops, and vice versa.

With conventional techniques, if the users want to keep track of the above example types of information, users often need to use different applications or tools to get these types of information. The drawbacks of these conventional techniques include, but are not limited to, the following:
1. Users launch and operate multiple tools manually.
2. Different types of status information involve different tools to gather and display the status information. It is difficult to view all of these types of status information at the same time using a single tool.
3. Users cannot view these types of status information while they are maximizing their working remote application (guest application), such as Microsoft Word, Google Chrome, etc., since the maximized application window covers other windows of applications, tools, etc.
4. Different applications have different types of application events (e.g., a new message in Slack, a new call in Microsoft Teams, new email in Microsoft Outlook, etc.). All these types of application events are of interest to users, but there is no centralized place to show all of these types of application events. Although some applications can show their events via a notification functionality provided by an operation system, the notifications may only appear for a short span of time and are not user friendly.

Presentation of Information with Variable Transparency

To address the above and other drawbacks, the embodiments disclosed herein leverage the unused areas of a local display screen to present the above and/or other types of information, for viewing by a user that is operating a remote desktop or is otherwise logged into a remote desktop session. The information may be presented on the display screen with variable and adjustable transparency.

For example, for purposes of convenience and assistance when working remotely, users often connect their laptop (or other local client device) to a larger (second) display screen, since the (first) display screen of a laptop is often too small or too crowded for daily work that involves viewing a large amount of information, applications, etc. The larger second display screen (e.g., a 27- or 32-inch monitor or other size monitor) enables the display screen of the laptop to be extended or duplicated, so that the user can concurrently view multiple applications, pages, documents, or other types of information or content.

Figure 3:
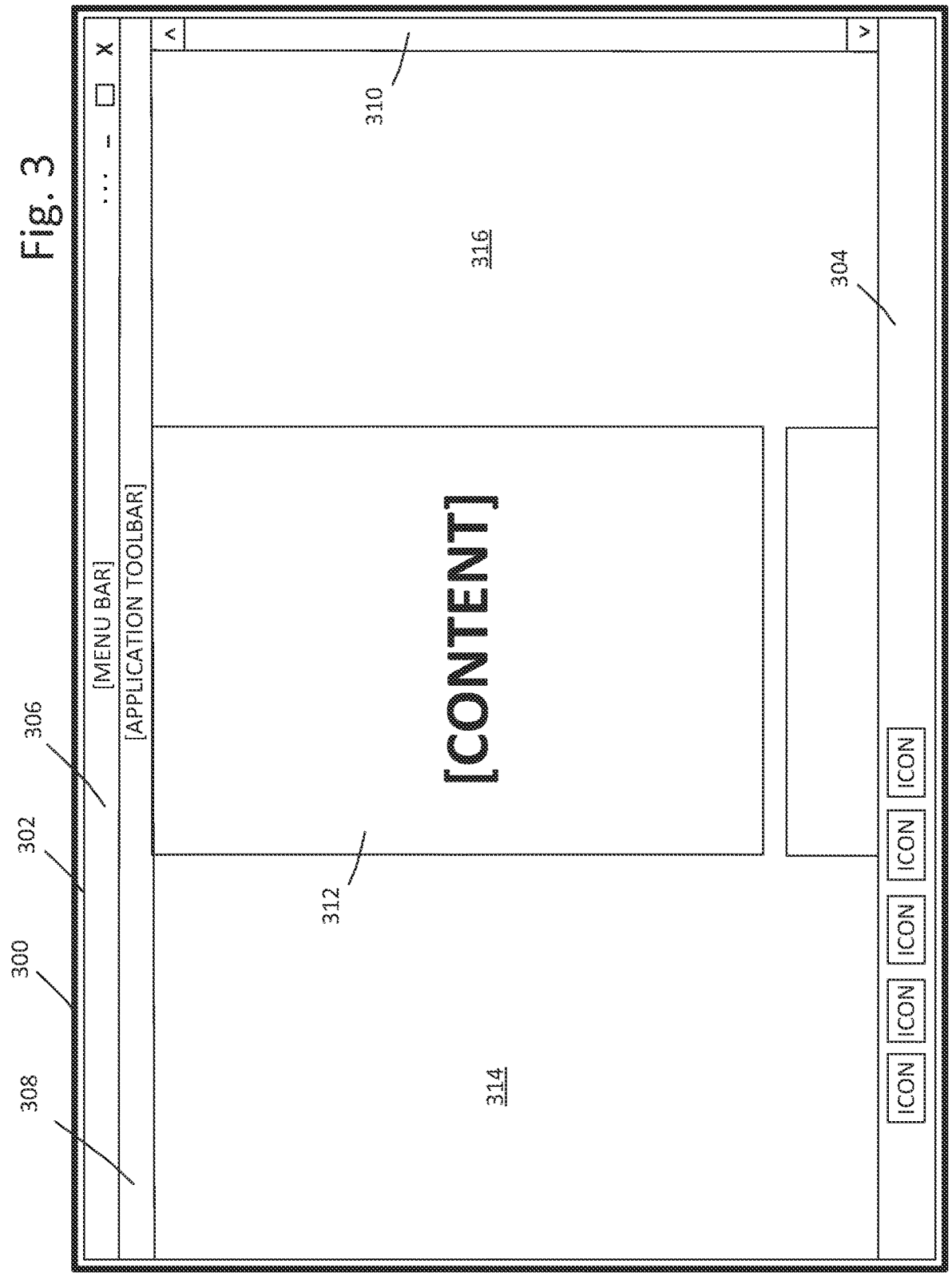
FIG. 3 is a diagram illustrating an example of an application file being presented on a display screen.

However, a large amount of the display area (real estate) of the second display screen is often unused, and so is typically wasted when working on a document, viewing a web page etc. For example, FIG. 3 is a diagram illustrating an example of an application file being presented on a display screen. Specifically, the user has logged into a remote desktop session and is using a display screen 300 as a second display screen connected to a first display screen (not shown in FIG. 3) of a laptop or other local client device.

The display screen 300 is rendering a remote desktop 302 as a remote display, which may include one or more bars, such as a task bar 304 and other graphics. A remote application (such as Microsoft Word), which is being accessed and used by the user via the remote desktop 302, is maximized and so fully occupies the real estate of the remote desktop 302. The remote application may display/include one or more bars (such as a menu bar 306, a tool bar 308, and a scroll bar 310) and a file (such as pages of a Microsoft Word document 312).

As depicted in the example of FIG. 3, the document 312 may be displayed in the center (a first region) of the remote display area of the remote desktop 302, while areas 314 and 316 (second regions) to the left and right (respectively) of the document 312 may be unused (e.g., not occupied by the document 312 and/or not used by other components of the remote application), and so the areas 314 and 316 are wasted.

While FIG. 3 depicts an example of a document 312 of a remote application and unused areas 314 and 316 of the display screen 300, analogous situations may occur with other applications, tools, etc. that are used via the remote desktop 302. For instance, a web page (or other file/content provided by the remote desktop 302) may be rendered in the left, center, right, etc. regions of the display screen 300, while other regions/areas of the display screen 300 may be unoccupied by the file and so are unused.

The embodiments described herein use the otherwise unused/wasted areas (e.g., one or more of the areas 314 and 316 or other areas) of the display screen 300 to present remote desktop information and/or other types of information. Thus, such areas are used to present information that is of interest to the user and such areas are not wasted. Such information presented in these areas may be unrelated or related to the other content (e.g., the document 312 of FIG. 3 as an example) that is presented on the display screen 300, and may be presented with user-selectable transparencies.

Figure 4:
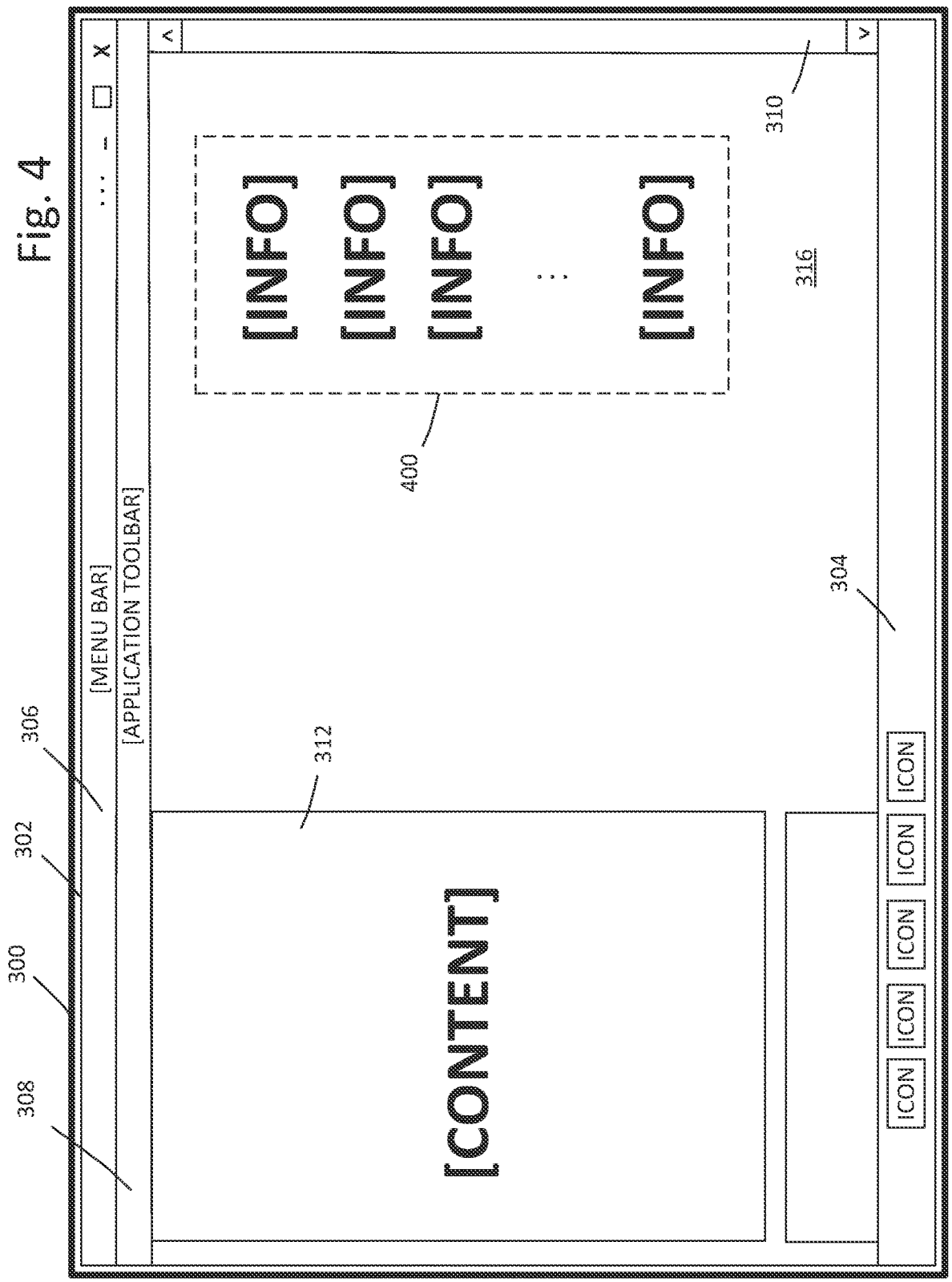
FIG. 4-6 are diagrams illustrating examples of different transparencies for information presented on the display screen of FIG. 3.
Figure 5:
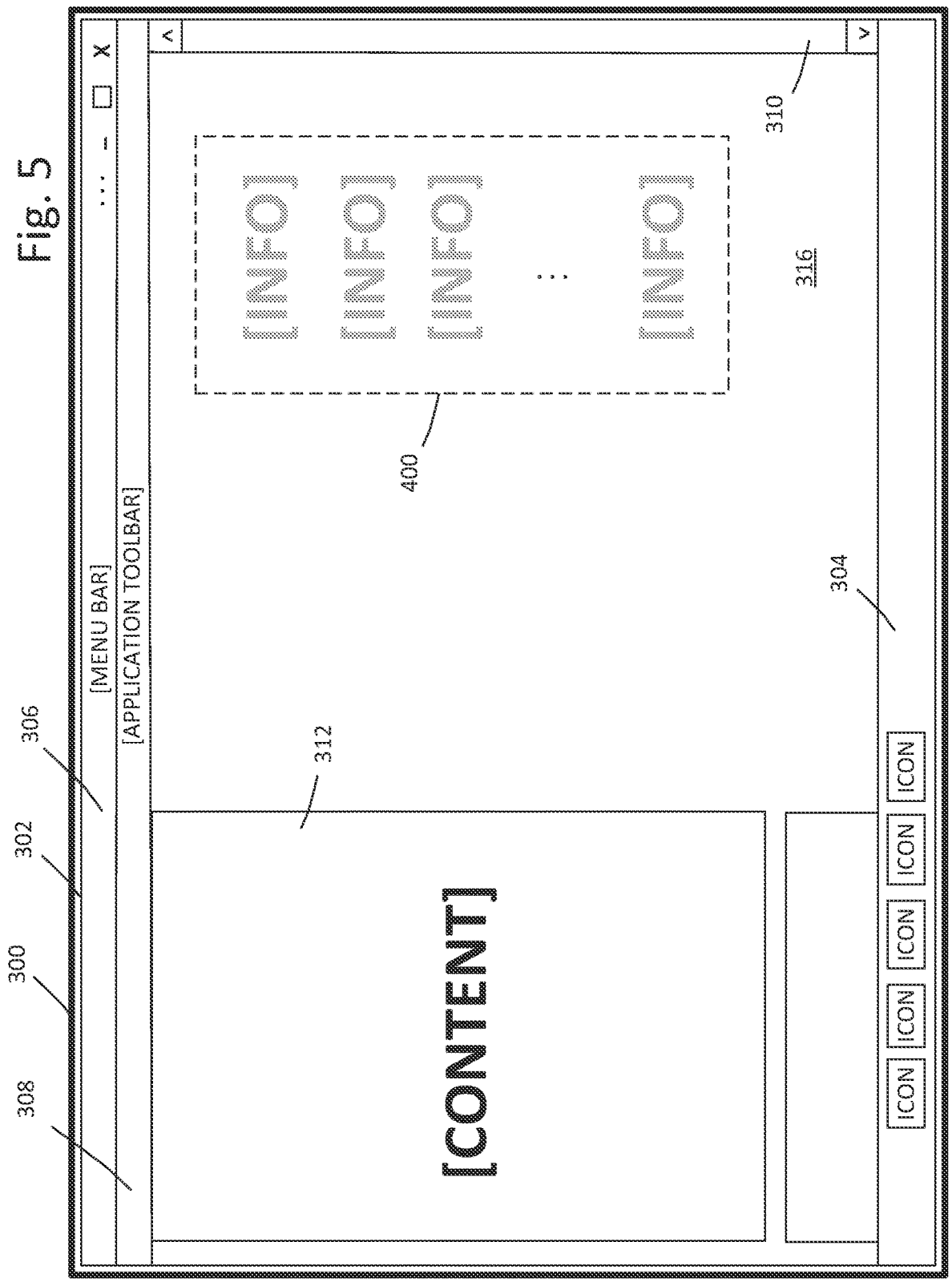
Figure 6:
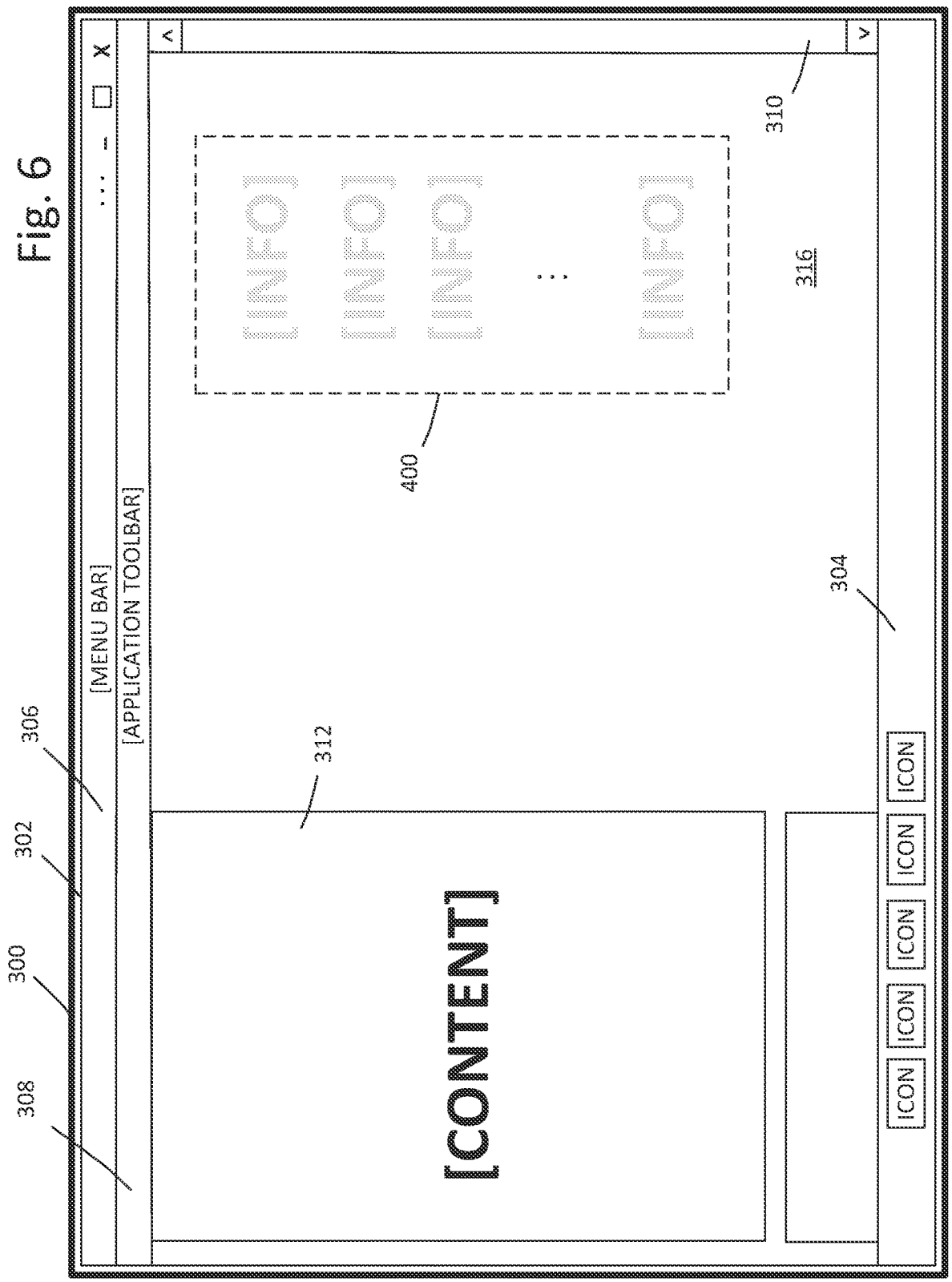

FIGS. 4-6 are diagrams illustrating examples of different transparencies for information presented on the display screen 300 of FIG. 3. More specifically, FIGS. 4-6 illustrate information 400 (other than the content of the document 312 of the remote application) concurrently being presented as an image along with the document 312 on the (previously unused) area(s) of the display screen 300. The information 400 may be presented with varied/different transparencies.

Referring first to FIG. 4 as an example, the document 312 of the remote application is displayed in the left area of the display screen 300, while one or more pieces of information 400 is displayed in the right area 316 (which was previously unused in FIG. 3) of the display screen 300. The information 400 can include text, graphics such as icons, animation, or other type of image(s) that can be presented for viewing. The amount or level of transparency of the information 400 can be set by the user to be between a range between 0% and 100%, with the image being invisible at 100% transparency and no transparency of the image at 0% transparency. The user may set a particular transparency, for example, dependent upon the amount of attention or distraction that the user wishes for the information 400.

In the example of FIG. 4, the transparency of the information 400 has been set at 0% transparency, and so the visibility of the information 400 is at a maximum (fully visible and no transparency). This 0% transparency is symbolically represented in FIG. 4 by black text for the information 400.

In the example of FIG. 5, the transparency of the information 400 has been set to a higher transparency such as 50% transparency, and so the visibility of the information 400 is between no transparency and invisibility. This 50% transparency is symbolically represented in FIG. 5 by gray text for the information 400, which is lighter in shade relative to the black text for the information 400 in FIG. 4.

In the example of FIG. 6, the transparency of the information 400 has been set to an even higher transparency such as 75% transparency, and so the visibility of the information 400 is approaching invisibility at 100% transparency. This 75% transparency is symbolically represented in FIG. 6 by gray text for the information 400, which is still lighter in shade relative to the gray text for the information 400 in FIG. 5.

In the examples shown in FIGS. 4-6, the transparency of the background behind the information 400 is at 100%, while the information 400 is presented at variable transparencies. In some embodiments, the transparency of the background may also be varied, or may be kept fixed at 100% transparency or other transparency level.

The information 400 may include remote information, specifically remote desktop information that pertains to remote applications, events from remote applications, status information, health information, etc. associated with the remote desktop 302 that is being used by the user during a remote desktop session. In some embodiments, local information may be included amongst the information 400, or may be presented on the display screen 300 additionally or alternatively to the information 400. Such local information may include information regarding local applications on the local client device and their events, status information pertaining to the local client device, etc. that the user may wish to view while operating the remote desktop 302 during a remote desktop session.

For the information 400, some status information may be highlighted in some embodiments, so as to more readily catch the user's attention. For example, relatively more urgent or more serious status conditions (such as a failed service, a broken peripheral, high CPU usage, an incoming call, etc.) may be highlighted in a manner different from other information. This highlighting may take the form of a different text color, different background color, animation (such as flashing or moving text), larger font size, graphical indicators, different transparency (e.g., more visible relative to other transparent text), or other visual effect that is different than the other content of the information 400, so as to more readily catch the user's attention.

Figure 7:
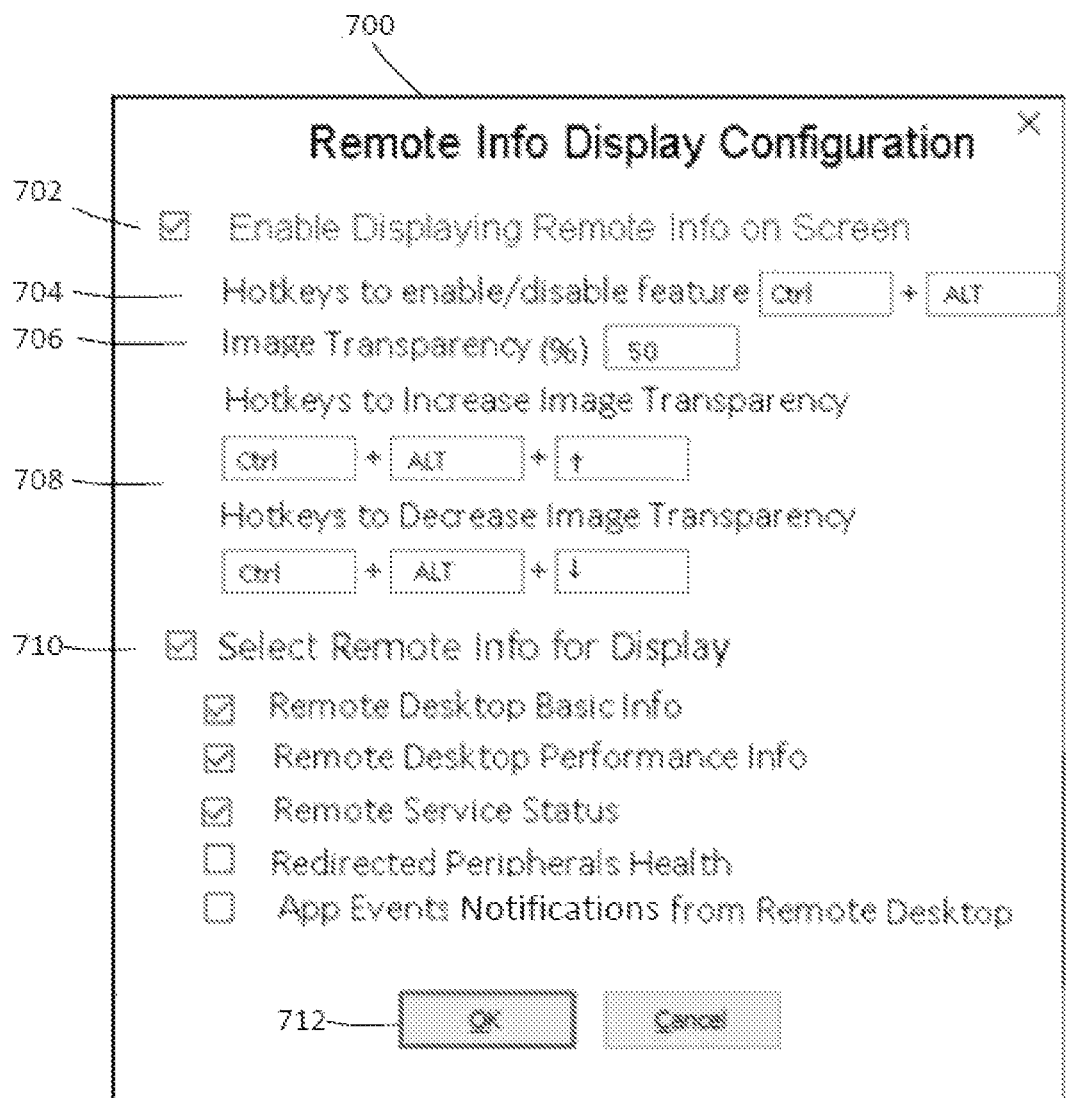
FIG. 7 shows an example user interface window that may be used to enable and configure the presentation of information with variable transparency.

FIG. 7 shows an example user interface (UI) window 700 that may be used to enable and configure the presentation of information with variable transparency, such as depicted in FIGS. 4-6. The user may access the UI window 700 by launching client software (e.g., a remote desktop application that is installed in the local client device) and then opening the UI window 700.

In the example of FIG. 7, the UI window 700 may be accessed so as to configure the presentation of remote information (e.g., remote desktop information)—the same UI window 700 and/or some other UI window or tool may be used to configure the presentation of local information (e.g., information regarding local applications on the local client device) while the user is operating a remote desktop.

The UI window 700 may present various UI elements, such as selection boxes, fillable fields, menus, prompts, buttons, etc. For example, the UI window 700 may include a UI element 702 that may be used by the user to enable or disable the feature of providing a presentation of remote information on the display screen 300. Alternatively or additionally, a UI element 704 enables the user to specify hotkeys (e.g., CTRL and ALT keys) that may be actuated to enable or disable the presentation of remote information, such as to turn on or turn off the presentation.

The user may specify the level of transparency via a UI element 706. UI elements 708 enable the user to specify hotkeys for changing/adjusting the transparency. For example, the user may specify CTRL+ALT+arrow up keys as the hotkeys to increase the image transparency, and CTRL+ALT+arrow down keys as the hotkeys to decrease the image transparency.

UI elements 710 may be provided to enable the user to select the types of remote information related to the remote desktop for presentation on the display screen 300. The selectable types of information may include those such as described above, including but not limited to: basic information about the remote desktop, performance-related information pertaining to the remote desktop, remote service status information, information pertaining to the health of redirected peripherals, notification of events associated with remote applications that are being used via the remote desktop, etc. These are just a few examples of remote desktop information that may be selected for presentation via the UI elements 710.

Other possible examples of UI elements for UI window 700 in other embodiments may include but are not limited to: a UI element to specify the size (e.g., length and width) of the image of the information 400, a UI element to specify whether the information 400 is to be presented on the first display screen or on the second display screen or other display screen (if present), a UI element to specify the area (e.g., left, center, or right) of the display screen where the information 400 is to be presented, a UI element to specify visual details of how to present certain types or parts of the information 400, etc.

After the user clicks an OK button 712 to complete the configuration and connects the local client device to a remote desktop, the remote information (selected via the UI elements 710) will be collected by monitoring tools of the remote desktop. When the user turns on the feature, the collected remote information is then displayed as a transparent image above the remote display (such as shown in FIGS. 4-6) with the specified transparency, with a default (or specified) size and position on the display screen 300. By default in some embodiments, the information 400 may be displayed on the right side of the remote desktop 302.

Users can modify the default display region/area for the information 400 by using hotkeys and a mouse. For example, to change the display area of live captioning (such as Live Transcribe), the user may first press hotkeys (e.g., CTRL+ALT keys on a keyboard) that are defined in the UI window 700, and concurrently left click a mouse button and drag a mouse to draw/define a region on the display screen 300. When the user releases both hotkeys on the keyboard and the mouse button, the newly defined region takes effect with information 400 displayed there.

According to various embodiments, the defined region for displaying the information 400 may be smaller than the remote desktop 302. The information will not be covered by any remote (guest) applications being used via the remote desktop since the information 400 is displayed as an image above (e.g., is superimposed over) the remote desktop 302.

In some embodiments, all of information 400 will have the same transparency as specified via the UI window 700 and are displayed in the same area of the display screen, which may also be specified via the UI window 700. In other embodiments, different types of information 400 may have corresponding different transparencies specified via the UI window 700. For example, status information may be displayed with more transparency than application event information, so as to better distinguish the images of two types of remote information on the display screen 300 for the user, such as if the user believes that the less-transparent application event information should be prioritized over the status information and so would be more readily visible. In some embodiments, the UI window 700 may also be used to specify a different area on the display screen 300 to respectively display different types of remote information. Other variations in the configuration of how and where to display the remote information are possible.

To assist in further explaining the details of how information (e.g., remote information) may be presented on the display screen 300 with varied transparency during a remote desktop session, a description is provided next below regarding a computing environment and client and agent components that may be provided to support the capability to present the information.

Computing Environment

FIG. 1 is a schematic diagram illustrating an example virtualized computing environment 100 that can implement a virtual desktop infrastructure (VDI) having capability to enable the transparent display of remote desktop information (and/or other information) concurrently with operating a remote desktop. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (e.g., remote applications and their corresponding processes) that run on top of the guest OS 122. Using the guest OS 122 and/or other resources of VM1 118 and the host-A 110A, VM1 118 may generate one or more remote desktops 126 (e.g., the remote desktop 302 or other virtual desktops) that is operated by and accessible to one or more client-side user device(s) 146 (e.g., a local client device) via the physical network 112. One or more virtual printers 128 also may be instantiated in VM1 118 and/or elsewhere in the host-A 110A, and may correspond to one or more physical printers (not shown) connected to the user device 146 at the client side. VM1 118 may include other elements, such as code and related data (including data structures), engines, etc., which will not be explained herein in further detail, for the sake of brevity. The user device 146 may include a first display screen 148 and other components (explained in more detail in FIGS. 2 and 8) to support the use of the user device 146 in cooperation with the virtual desktop 126 and other elements of VM1 118. The first display screen 148 or some other display screen may render the UI window 700 of FIG. 7 when the user device 146 launches a remote desktop application.

According to various embodiments, VM1 118 may operate as an agent that provides the remote desktop 126 (and other remote desktop features) to one or more of the user device 146. For instance, the agent can cooperate with client software (referred to at times herein as a remote desktop application, client application, remote desktop client, or client, installed at the user device 146) to establish and maintain a remote desktop connection between VM1 118 and the user device 146 for purposes of enabling the user to operate the user device 146 in order to access and use the remote desktop 126. In some embodiments, the agent can be a sub-component of VM1 118. Examples of the agent and client software are the Horizon agent and the Horizon client, respectively, of VMware, Inc. of Palo Alto, California. One or more connection servers 216 (shown in FIG. 2) can broker or otherwise manage communications between the agent (e.g., a Horizon agent or other analogous remote desktop agent) and the client software (e.g., a Horizon client or other analogous remote desktop client) over a VDI connection 208 (also shown in FIG. 2) provided by the physical network 112. A management server 142 and/or other server(s)/device(s) can operate as the connection server in some implementations.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and remote application(s) in the virtual machine, such as the guest OS 122 and the guest application(s) 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
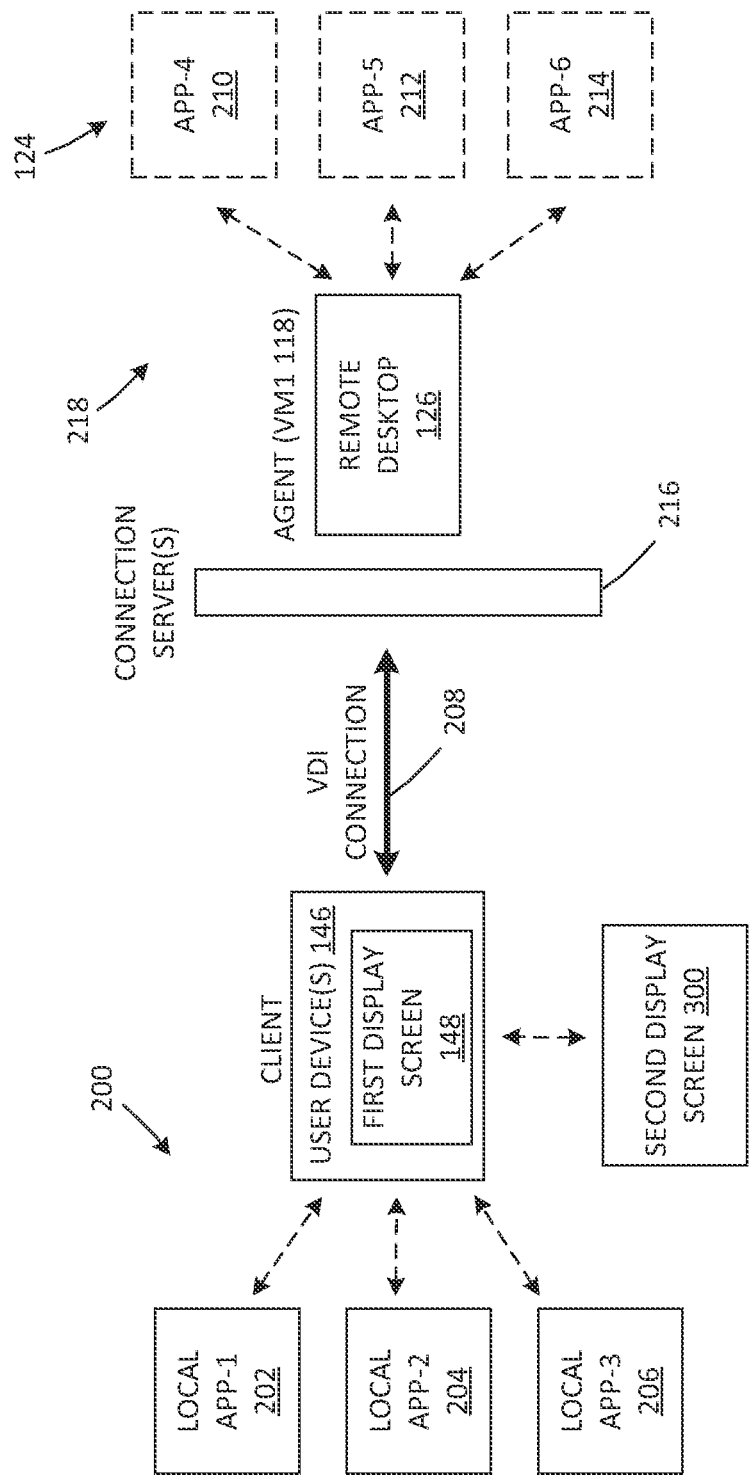
FIG. 2 is a schematic diagram illustrating client and agent devices for the virtualized computing environment of FIG. 1.

FIG. 2 is a schematic diagram illustrating client and agent devices for the virtualized computing environment 100 of FIG. 1. More specifically, FIG. 2 shows a client (e.g., a Horizon client or other analogous remote desktop client running on the user device 146), an agent (e.g., the VM1 118 and/or a component thereof, such as a Horizon agent or other analogous remote desktop agent, that provides the remote desktop 126 and which runs on a host), and their associated remote applications that may be displayed on their respective desktops (remote displays).

At a client side 200, the user device 146 may have local applications (APPs) installed on it. These applications may include a local APP-1 202, a local APP-2 204, a local APP-3 206, etc. These local applications (e.g., their respective icons or launched files/interfaces) may in turn be presented on a local desktop rendered on the first display screen 148 of the user device 146. Examples of these local applications (which may generate their own respective events) may include but not be limited to Slack, Microsoft Teams, Microsoft Outlook, and/or other types of messaging/collaboration applications, as well as other locally installed applications such as a calendar application, word processing application, spreadsheet application, games, browser, etc.

One or more additional (second) display screens, such as the display screen 300 of FIGS. 3-6, may be connected to the user device 146. The display screen 300 may have a larger display area than the first display screen 148. A remote desktop and its applications may be displayed on either or both of the display screens 148 and 300, concurrently with or without local applications/content also being displayed. The user may select one of the display screens 148 and 300 to be a primary display screen, and may select the other display screen to be a secondary display screen. Various display configurations and capabilities may be provided.

The remote desktop client installed at the user device 146 may use one or more VDI connections 208 to establish and conduct a remote desktop session with the VDI at an agent side 218. One or more connection servers 216 at the agent side 218 may manage these connections to the remote desktops 126 (e.g., for brokering communications, load balancing purposes, etc.).

At the agent side 218, the remote desktop 126 may provide remote applications installed/running thereon (e.g., the guest applications 124 of FIG. 1). These applications on the remote desktop 126 may include an APP-4 210, an APP-5 212, an APP-6 214, etc. These applications (e.g., their respective icons or launched files/interfaces) may in turn be presented on the remote desktop 126 rendered on the display screen 300 or 148 of the user device 146 (e.g., the remote desktop 302 shown in FIGS. 3-6), when the user device 146 accesses the remote desktop 126.

Client and Agent for Presentation of Information with Variable Transparency

Figure 8:
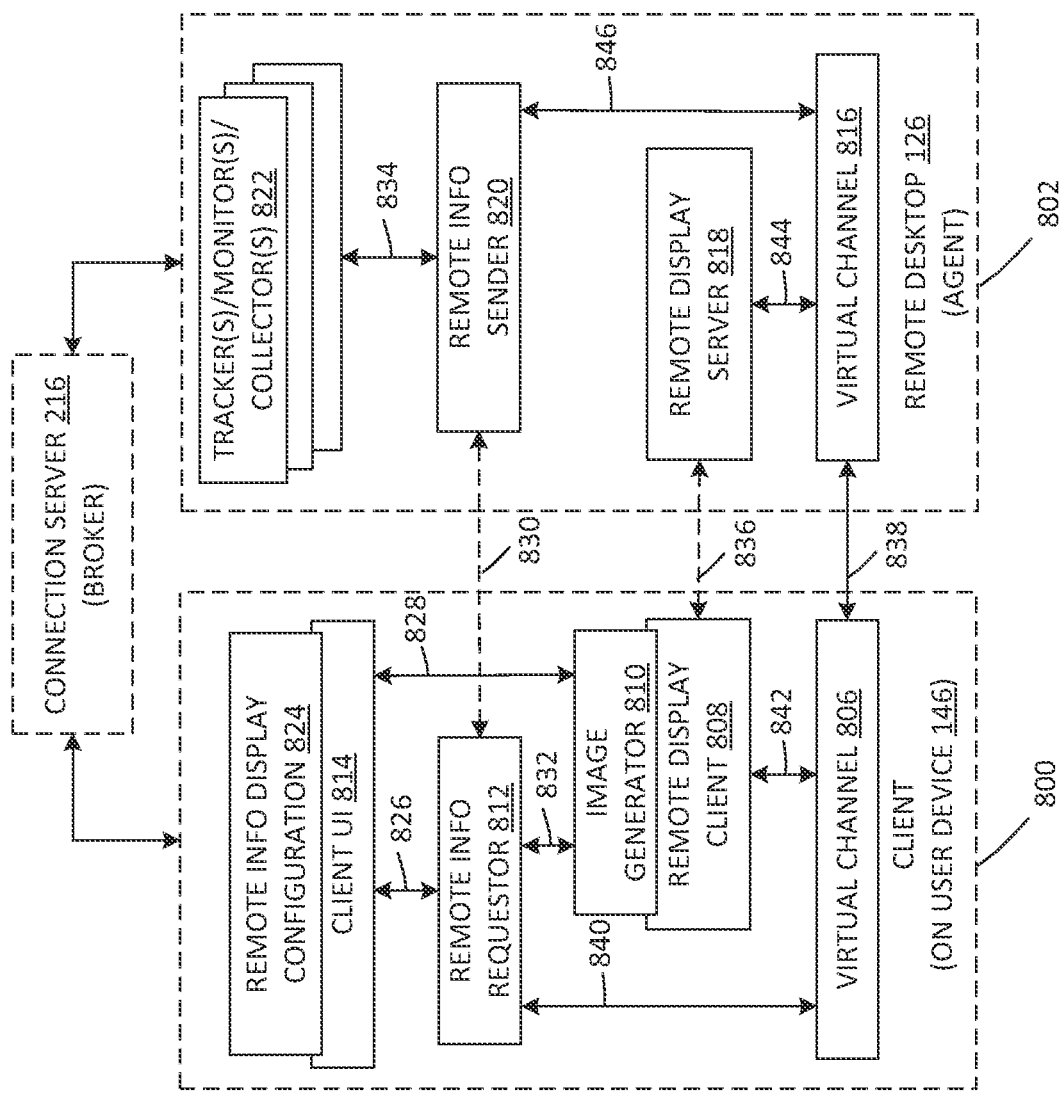
FIG. 8 is a schematic diagram illustrating components of a client and agent that cooperate to enable presentation of information with variable transparency.

FIG. 8 is a schematic diagram illustrating components of a client and an agent that cooperate to enable presentation of information with variable transparency. More specifically, FIG. 8 shows example components of a remote desktop client 800 (e.g., a Horizon client or other analogous remote desktop client), a remote desktop agent 802 (e.g., a Horizon agent or other analogous remote desktop agent), and other components/devices of FIG. 2 that may support the capability to present information 400 on a display screen 300 such as depicted in FIGS. 4-6 above. Various components of the client, agent, etc. of FIG. 8 may be embodied as software or other computer-readable instructions stored on computer-readable media and executable by one or more processors, may be embodied in hardware, and/or may be embodied as a combination of hardware and software.

The client 800 may reside on the user device 146 at the client side. The agent 802 resides on a host at the agent side and is configured to provide one or more remote desktops 126 and related functionality to the client 800. The connection server 216 operates to broker communications between the agent 802 and the client 800.

The client 800 may comprise, among other things, various components such as a virtual channel 806, a remote display client 808, an image generator 810, a remote information requestor 812, and a client UI 814. The agent 802, may comprise, among other things, various components such as a virtual channel 816, a remote display server 818, a remote information sender 820, and one or more trackers, monitors, and collectors (all collectively referred to herein as monitors 822).

Remote information display configuration settings 824 may be provided/specified using the UI window 700, and are accessible and used by the client UI 814. In some embodiments, the client UI 814 may include or provide the UI window 700. As previously described above, the user may provide the configuration settings 824 (via the UI window 700) to enable/disable the feature of providing the presentation of information 400 and to select the types of information 400 to display, as well as other configuration details such as the transparency of the information 400, the image size of the information 400, the hotkeys to turn on/off the presentation of the information 400 or to increase/decrease the transparency, etc. The configuration settings 824 may be stored locally at the user device 146, and so users may perform re-configuration if some other local client device is used for remote desktop sessions.

If the user changes the configuration settings 824 with respect to the types of information 400 to display, such as by using the UI window 700 to deselect the basic information for the remote desktop, selecting remote service status information, etc., the remote information requestor 812 may be notified of such changes at 826 via the client UI 814. If the user changes the display configuration of the information 400, such as by using the UI window 700 to change the transparency, image size, position on the display screen 300, etc., the image generator 810 may be notified of such changes at 828 via the client UI 814.

According to various embodiments, the remote information requestor 812 may be configured to perform one or more of the following:

1. Obtain (at 826) the configuration settings 824 for displaying the information 400, when the user device 146 connects to the remote desktop 126.
2. Communicate (at 830) with the remote information sender 820 on the remote desktop 126 so as to notify the remote information sender 820 of the user-selected types of remote information to be displayed, if the user has used the UI window 700 to enable the presentation of the information 400 and has made selections as to the types of information 400 to be displayed.

3. Receive (at 830) the collected remote information from the remote information sender 820 and relay (at 832) the remote information to the image generator 810.

4. If the user changes the configuration settings 824, such as by deselecting basic information for the remote desktop, selecting remote service monitor, etc., the remote information requestor 812 is informed (at 826) of these changes so as to enable the remote information requestor 812 to synchronize (at 830) the changes with the remote information sender 820 on the remote desktop 126, which then informs (at 834) the monitor(s) 822 to collect or not collect the remote information specified by the user.

According to various embodiments, the image generator 810 is configured to receive/retrieve (at 832) the remote information from the remote information requestor 812 and generate an image based on retrieved remote information, user-defined transparency, image size, etc. The image may be re-generated at a fixed interval (for example, every 1 second). The image generator 810 may be informed (at 828) of changes in the configuration settings 824 that pertain to displaying the image (e.g., changes in the image transparency, image size and location, etc.) and the image is re-generated to reflect the changes. If the user does not set the image size in the UI window 700, then the image generator 810 generates the image based on default values for the remote display.

The remote display client 808 may be configured to display graphical data of the remote desktop 126, and further configured to display the image of the remote information (e.g., the information 400) generated by the image generator 810, above the remote desktop 302 and at the selected location/side of the remote desktop 302 and display screen 300, such as depicted in FIGS. 4-6, based on the user's configuration settings. By default, the image may be displayed on the right side of and on top of the remote desktop 302. The remote display client 808 re-locates the image of the remote information to the correct position relative to the image/window of the remote desktop if the user resizes or moves the window of the remote desktop 302, so that the user sees the image of the remote information being displayed on the correct position on the remote desktop 302.

The remote display client 808 may receive (at 836) the graphical data of the remote desktop 126 from the remote display server 818. The virtual channels 806 and 816 may be used for communicating (at 838) data, graphics, files, instructions, etc. between the client 800 and the agent 802. The remote information requestor 812 and the remote display client 808 may also use the virtual channels 806 and 816 to send/receive information (at 840 and 842, respectively).

With regards to the agent 802, the monitors 822 may include services, agents, daemons, application program interfaces (APIs), or other tools to monitor, track, collect, or otherwise obtain the remote information specified by the user. Examples of the monitors 822 may include, but not be limited to, a remote desktop basic information collector, a remote service monitor, a performance tracker, a redirected peripheral monitor, an application event monitor, and so forth.

The remote desktop basic information collector may be configured to collect the basic information pertaining to the remote desktop, such as the IP address, hostname, domain, hardware specifications, etc., and send (at 834) such information to the remote information sender 820. The remote service monitor may be configured to monitor the remote services (such as a Horizon agent service or other analogous remote desktop agent service, display protocol service, client drive redirection service, clipboard redirection service, URL redirection service, etc.) installed on the remote desktop 126, and update the status of these services that is regularly sent (at 834) to the remote information sender 820.

The performance tracker may be configured to regularly send (at 834) the user-specified performance information (such as the network bandwidth, the client-to-remote/remote-to-client display protocol, the FPS of the remote display, the CPU usage on the remote desktop 126, etc.) to the remote information sender 820. The redirected peripheral monitor may be configured to monitor the health of peripherals redirected from the user device 146 (such as a camera, mouse, keyboard, smartcard reader, printer, etc.), and regularly send (at 834) this health information to the remote information sender 820.

The application event monitor may be configured to monitor application events (such as new message in Slack, an incoming call in Microsoft Teams, a new email in Microsoft Outlook, etc.) that occur on guest applications 124 installed on the remote desktop 126, and send (at 834) the events to the remote information sender 820. Application events can be obtained, for example, by injecting a dynamic link library (DLL) to corresponding applications to get informed when application events occur or by leveraging existing notification functionality of the guest OS 122 (such as Microsoft Windows) on VM1 118 that runs the remote desktop 126.

For example, DLL technology may be used for injection into an application's process so as to hook the application's functions, in a manner that the application event monitor can be notified when some application function related events occur. As another example, the application event monitor may use Microsoft Windows' push notification services to get application event notifications from the applications that are using these notification services to publish application events. Other methods for monitoring/tracking events associated with the applications 124 can be used by the application event monitor.

The remote information sender 820 may be configured to perform one or more of the following:

1. Communicate (at 830) with the remote information requestor 812 on the client 800 so as to be notified of configuration settings 824 that specify the types of remote information that the user wishes to collect and display.
2. Request (at 834) the corresponding monitors 822 to collect user-specified remote information.
3. Send (at 830) the remote information (retrieved from the monitors 822) to the remote information requestor 812 on the client 800, which then sends (at 832) the remote information to the image generator 810.

The remote information sender 820 and the remote display server 818 may also use (at 846 and 844, respectively) the virtual channel 816 for communication with the client 800. Graphics, data, files, commands, or other types of content/information may be involved in these communications.

Figure 9:
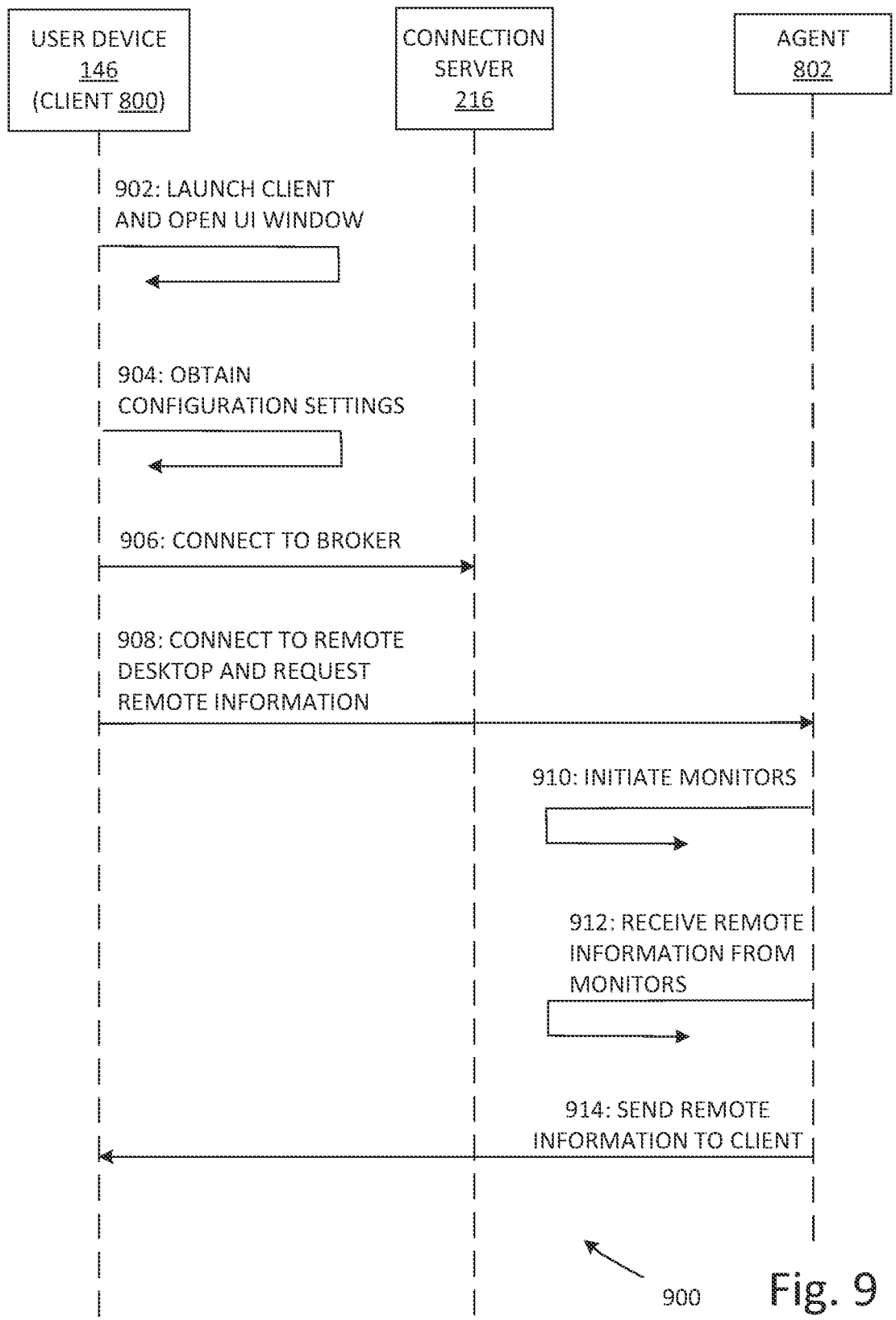
FIGS. 9 and 10 are flow diagrams of an example method to present information with adjustable transparency on a display screen.
Figure 10:
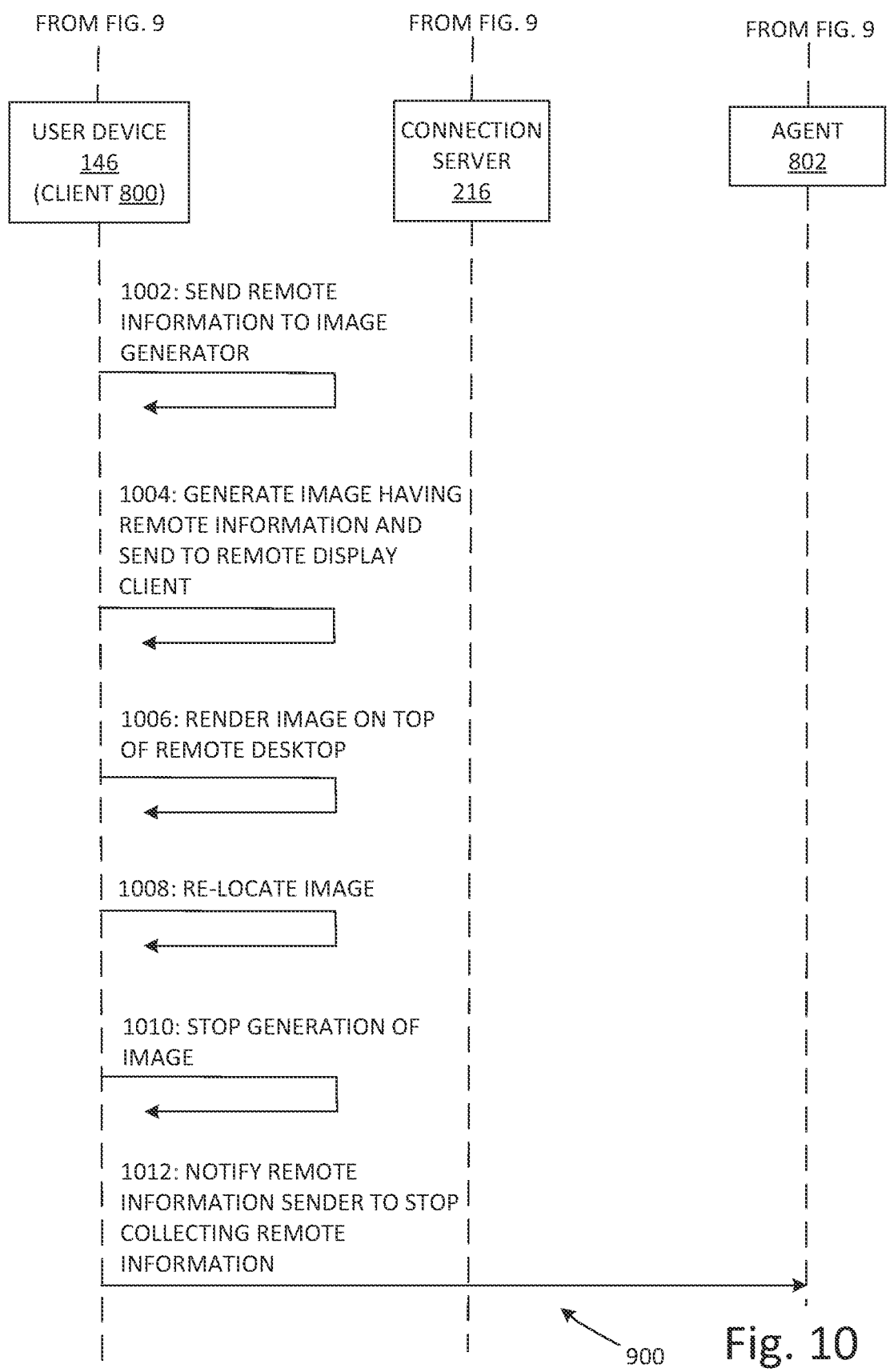

FIGS. 9 and 10 are flow diagrams of an example method 900 to present information with adjustable transparency on a display screen. More specifically, the method 900 may be performed to present the information 400 on top of the remote desktop 302 at a particular (unused or unoccupied) area of the display screen 300 and with controllable transparency, such as depicted in the examples of FIGS. 4-6.

The example method 900 may include one or more operations, functions, or actions illustrated at 902 to 1012, in which the operations of FIG. 9 continue into FIG. 10. The various operations of the method 900 and/or of any other process(es) described herein may be combined into fewer operations, divided into additional operations, supplemented with further operations, and/or eliminated based upon the desired implementation. In one embodiment, the operations of the method 900 and/or of any other process(es) described herein may be performed in a pipelined sequential manner. In other embodiments, some operations may be performed out-of-order, in parallel, etc. The operations in the method 900 are described below with reference to the various components shown in FIGS. 1-8.

According to one embodiment, the method 900 may be performed by the client 800, in cooperation with at least one agent (e.g., the agent 802) and the connection server 216 for some operations. In other embodiments, various other elements in a computing environment may perform, individually or cooperatively, the various operations of the method 900.

At 902 ("LAUNCH CLIENT AND OPEN UI WINDOW"), the client 800 is launched at the user device 146, and the user opens the UI window 700 on the (first) display screen of the user device 146 or on the (second) display screen 300 that is connected to the user device 146, so as to specify some of the configuration settings 824. For example and as previously explained above, the user may access and use the UI window 700 to provide the configuration settings 824 to the client 800, at 904 ("OBTAIN CONFIGURATION SETTINGS"), so as to enable the presentation of the information 400 (e.g., remote information), specify the type of remote information to be presented, specify the transparency of the remote information, specify the display screen (e.g., the display screen 300) that will present the remote information as an image, specify the area on the display screen 300 where the remote information is to be presented, specify hotkeys, specify the size of the image of the remote information and other visual details, etc.

At 906 ("CONNECT TO BROKER"), the client 800 connects to the connection server 216 that is operating as a broker, so as to initiate a remote desktop session between the client 800 and the agent 802, in which the remote desktop 126 is rendered on the display screen 300 as the remote desktop 302. For example, the client 800 may provide credentials to the connection server 216 to indicate that the client is entitled/authorized to access one of the remote desktops(s) provided by a VM, and then retrieves one of the remote desktops 126.

At 908 ("CONNECT TO REMOTE DESKTOP AND REQUEST REMOTE INFORMATION"), the client 800 is connected to the remote desktop (e.g., the agent 802) via the VDI connection 208, and remote desktop 302 is rendered on the display screen 300. At 908, the remote information requestor 812 also communicates with the remote information sender 820 to request the remote information selected/specified by the user via the UI window 700.

At 910 ("INITIATE MONITORS"), the agent 802 initiates one or more of the applicable monitors 822 to begin and then continue collecting the remote information specified by the user. At 912 ("RECEIVE REMOTE INFORMATION FROM MONITORS"), the remote information sender 820 receives the remote information collected by the monitor(s) 822.

At 914 ("SEND REMOTE INFORMATION TO CLIENT"), the remote information sender 820 sends the collected remote information to the remote information requestor 812 at the client 800. The method 900 then continues in FIG. 10.

At 1002 ("SEND REMOTE INFORMATION TO IMAGE GENERATOR"), the remote information requestor 812 sends the collected remote information to the image generator 810. The remote information requestor 812 may repeatedly send the remote information to the image generator 810 at 1002, as the report information is received from the remote information sender 820 and/or as updates, status changes, retransmissions, new transmission, refresh, etc.

At 1004 ("GENERATE IMAGE HAVING REMOTE INFORMATION AND SEND TO REMOTE DISPLAY CLIENT"), the image generator 810 generates one or more images having the remote information. The generated image(s) may have a size, transparency, and other characteristics based on the configuration settings 824. The image generator 810 sends the generated image(s) to the remote display client 808 for displaying the image(s) at the specified area on the display screen 300, such as on top of the image of the remote desktop 302 and at an unoccupied area/region of the display screen.

At 1006 ("RENDER IMAGE ON TOP OF REMOTE DESKTOP"), the remote display client 808 renders the image(s) of the remote information on top of the graphical data (image) of the remote desktop 302, at the specified or default area of the display screen 300 (such as at the right, left, center, or other region of the display screen 300) and at the specified transparency.

The user may choose to move and/or resize the image of the remote desktop 302. At 1008 ("RE-LOCATE IMAGE"), the remote display client 808 re-locates the image of the remote information so that the image of the remote information continues to be rendered at the correct position relative to and on top of the resized/moved image of the remote desktop 302. In this manner, the user will always see the image of the remote information at the same location on top of the remote desktop 302.

In other embodiments, it may be possible to provide the user with an option to independently control the size and position of the image of the remote information relative to the image of the remote desktop. For example, when the user resizes or moves the image of the remote desktop, the image of the remote information can be kept at the same size or the same location without following the remote desktop, or may be resized and located differently from the remote desktop.

At 1010 ("STOP GENERATION OF IMAGE"), the image generator 810 stops generating the image of the remote information if the user minimizes the remote desktop 302, and so the image of the remote information is not displayed. In some embodiments, it may be possible to provide the user with the option to continue displaying the remote information after the remote desktop is minimized.

At 1012 ("NOTIFY REMOTE INFORMATION SENDER TO STOP COLLECTING REMOTE INFORMATION"), when the client 800 initiates a disconnection from the remote desktop session, the remote information requestor 812 notifies the remote information sender 820 to discontinue monitoring and collecting remote information for the remote desktop.

From the embodiments disclosed herein, several benefits are realized. For example, users may view and monitor the status of remote desktops without launching other applications or tools. The displayed information (e.g., remote information) are not covered by applications of the remote desktop—the displayed information remains viewable. Furthermore, the displayed information may be updated dynamically and in real time, and such updated information can be viewed by the user as the updates occur.

Also, the displayed information can be presented with different selectable transparencies, and so may not be an undue distraction to the user. The displayed information may be presented on an unused (e.g., previously unoccupied) area on the display screen, and so does not cover the user's work.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-10. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to present information concurrently with remote desktop, the method comprising:
   displaying the remote desktop on a display screen, wherein the display screen includes a first region where a file provided by the remote desktop is presented and a second region that is unoccupied by the file;
   receiving the information from an agent that provides the remote desktop, wherein the information is associated with the remote desktop;
   presenting an image of the information at the second region of the display screen, wherein the image is transparent;
   providing a user interface (UI) window to configure the presentation of the information at the second region, including specifying a transparency level of the information and different types of the information to present at the second region; and
   notifying the agent of the different types of the information so as to enable the agent to monitor and collect the different types of information,
   wherein the information includes remote information that is one or more of: basic information pertaining to the remote desktop, performance-related information pertaining to the remote desktop, remote service status information pertaining to services of the remote desktop, health information pertaining to redirected peripherals of the remote desktop, or event information pertaining to applications that are usable via the remote desktop.

2. The method of claim 1, wherein an image of the remote desktop fully occupies the display screen, and wherein the image of the information is presented at the second region on top of the image of the remote desktop.

3. The method of claim 1, wherein receiving the information from the agent includes receiving the information at a client that is installed at a user device having a first display screen, and wherein the display screen that presents the image of the information is a second display screen that is connected to the user device.

4. The method of claim 1, wherein the UI window to configure the presentation of the information at the second region specifies hotkeys to adjust the transparency level.

5. The method of claim 1, further comprising:
   moving or resizing the displayed remote desktop on the display screen; and
   presenting the information on the display screen at a same position relative to the moved or resized remote desktop.

6. The method of claim 1, further comprising presenting additional information at the second region of the display screen, wherein the additional information is also transparent and pertains to a user device having a client that communicates with the agent.

7. A non-transitory computer-readable medium having instructions stored thereon, which in response to execution by one or more processors, cause the one or more processors to perform a method to present information concurrently with a remote desktop, wherein the method comprises:
   displaying the remote desktop on a display screen, wherein the display screen includes a first region where a file provided by the remote desktop is presented and a second region that is unoccupied by the file;
   receiving the information from an agent that provides the remote desktop, wherein the information is associated with the remote desktop;
   presenting an image of the information at the second region of the display screen, wherein the image is transparent;
   providing a user interface (UI) window to configure the presentation of the information at the second region, including specifying a transparency level of the information and different types of the information to present at the second region; and
   notifying the agent of the different types of the information so as to enable the agent to monitor and collect the different types of information,
   wherein the information includes remote information that is one or more of: basic information pertaining to the remote desktop, performance related information pertaining to the remote desktop, remote service status information pertaining to services of the remote desktop, health information pertaining to redirected peripherals of the remote desktop, or event information pertaining to applications that are usable via the remote desktop.

8. The non-transitory computer-readable medium of claim 7, wherein an image of the remote desktop fully occupies the display screen, and wherein the image of the information is presented at the second region on top of the image of the remote desktop.

9. The non-transitory computer-readable medium of claim 7, wherein receiving the information from the agent includes receiving the information at a client that is installed at a user device having a first display screen, and wherein the display screen that presents the image of the information is a second display screen that is connected to the user device.

10. The non-transitory computer-readable medium of claim 7, wherein the UI window to configure the presentation of the information at the second region specifies hotkeys to adjust the transparency level.

11. The non-transitory computer-readable medium of claim 7, wherein the method further comprises:
   moving or resizing the displayed remote desktop on the display screen; and
   presenting the information on the display screen at a same position relative to the moved or resized remote desktop.

12. The non-transitory computer-readable medium of claim 7, wherein the method further comprises presenting additional information at the second region of the display screen, wherein the additional information is also transparent and pertains to a user device having a client that communicates with the agent.

13. A computing device, comprising:
   a processor; and
   a non-transitory computer-readable medium coupled to the processor and having instructions stored thereon, which in response to execution by the processor, cause the processor to perform operations to present information concurrently with a remote desktop, wherein the operations comprise:
   display the remote desktop on a display screen, wherein the display screen includes a first region where a file provided by the remote desktop is presented and a second region that is unoccupied by the file;
   receive the information from an agent that provides the remote desktop, wherein the information is associated with the remote desktop;
   present an image of the information at the second region of the display screen, wherein the image is transparent;
   provide a user interface (UI) window to configure the presentation of the information at the second region, including specifying a transparency level of the information and different types of the information to present at the second region; and
   notify the agent of the different types of the information so as to enable the agent to monitor and collect the different types of information,
   wherein the information includes remote information that is one or more of: basic information pertaining to the remote desktop, performance related information pertaining to the remote desktop, remote service status information pertaining to services of the remote desktop, health information pertaining to redirected peripherals of the remote desktop, or event information pertaining to applications that are usable via the remote desktop.

14. The computing device of claim 13, wherein an image of the remote desktop fully occupies the display screen, and wherein the image of the information is presented at the second region on top of the image of the remote desktop.

15. The computing device of claim 13, wherein the operations to receive the information from the agent includes operations to receive the information at a client that is installed at the computing device which has a first display screen, and wherein the display screen that presents the image of the information is a second display screen that is connected to the computing device.

16. The computing device of claim 13, wherein the operations further comprise:
   move or resize the displayed remote desktop on the display screen; and
   present the information on the display screen at a same position relative to the moved or resized remote desktop.

17. The computing device of claim 13, wherein the operations further comprise:

present additional information at the second region of the display screen, wherein the additional information is also transparent and pertains to the computing device.

18. The computing device of claim 13, wherein the UI window to configure the presentation of the information at the second region specifies hotkeys to adjust the transparency level, and the operations further comprise:

move or resize the displayed remote desktop on the display screen; and present the information on the display screen at a same position relative to the moved or resized remote desktop.

* * * * *